J. E. WISNER.

Horse Hay-Rakes.

No. 6,069.

Reissued Sept. 29, 1874.

Witnesses.
C. F. Brown
M. Church

Inventor
J. E. Wisner
by his Attys.
Hill & Greenwood

BEST AVAILABLE COPY

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 108,744, dated October 25, 1870; reissue No. 6,669, dated September 29, 1874; application filed June 20, 1874.

DIVISION A.

*To all whom it may concern:*

Be it known that I, JAMES E. WISNER, of Friendship, in the county of Allegany and State of New York, have invented certain new and useful Improvements in Horse Hay-Rakes; and I do hereby declare the following to be a full, clear, and exact description of the same, reference being had to the accompanying drawing forming part of this specification, in which—

Figure 2:
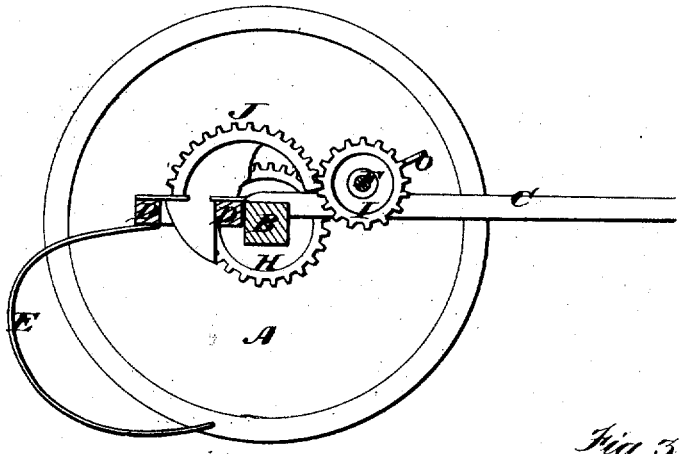
Figure 1:
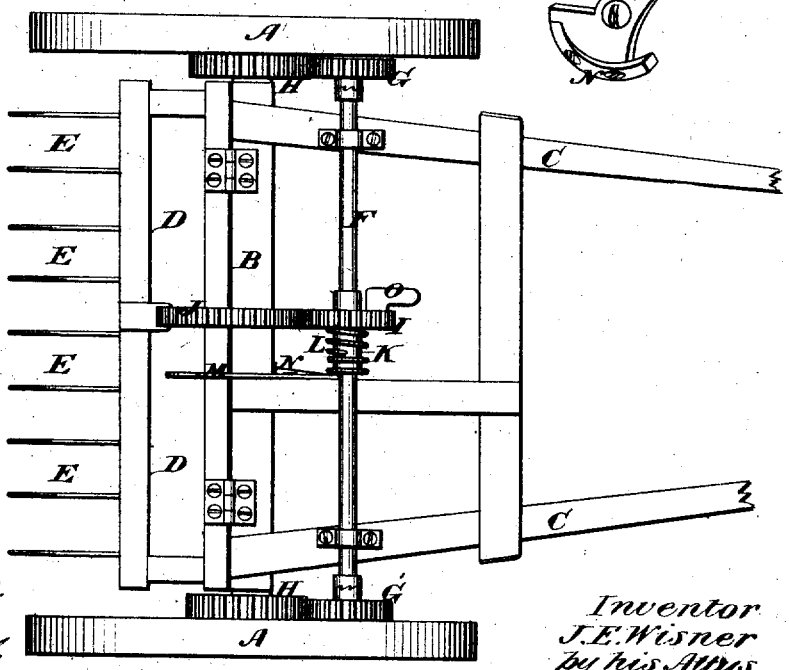
Figure 3:
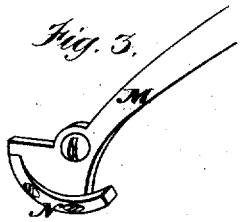

Figure 1 is a top-plan view of a horse hay-rake, showing my improvements applied thereto. Fig. 2 is a longitudinal section of the same, in the plane of the line *x x*, Fig. 1; and Fig. 3 is a detached view of the operating-lever.

Similar letters of reference denote corresponding parts.

My invention belongs to that class of two-wheeled horse hay-rakes in which the rake-teeth are raised to discharge the load by the power of the team, at the will of the operator. The object of the invention is to improve the means for raising the teeth, so as to simplify the construction of the machine, dispense with a rocking frame projecting in front of the axle, obtain the draft equally from both draft-wheels, apply it equally and uniformly to the rake-head or part which supports the rake-teeth, and increase the ease, certainty, and uniformity of the action of the rake. To this end the invention consists, primarily, in means of obtaining power equally from both draft-wheels, viz., by a shaft constantly rotating in the forward movement of the machine, and extending across the whole width of the machine, and provided at its ends with small pinion-gearing, with pinions attached to the draft-wheels, so as to turn the shaft in one direction, but not in the other. It consists, secondly, in the means which I shall proceed to describe for communicating motion from said shaft to the rake-head or device which supports the rake-teeth at the proper time for raising the teeth to dump the load; and it consists, thirdly, in the means for automatically arresting the upward movement of the rake-teeth when dumping the load, and causing them to drop back to gather a fresh load, and particularly in the construction of such apparatus so that the point to which the rake-teeth can be raised before they will be released and dropped may be varied and adjusted according to the kind of work required of the rake in any particular locality.

In the accompanying drawing, A A are the wheels, B the axle, and C the shafts, of a horse hay-rake of the ordinary construction. D is the rake-head, provided with the teeth E, and hinged to the rear of the axle, as shown. F is a transverse shaft, mounted in bearings upon the thills or frame of the rake, in front of the axle, and provided at each end with pinions G G′, which engage with pinions H, affixed to the inner end of the hubs or face of the wheels around the hubs. I is another pinion, mounted loosely upon the center of the shaft F, and adapted to engage with a segmental gear-wheel, J, securely attached to the rake-head. K is a sleeve attached to the shaft F by a feather and groove, so that it shall rotate with the shaft and slide longitudinally upon the same. This sleeve, together with the hub of the pinion I, forms a clutch, the two parts being held disengaged by the tension of the spring L. Pivoted to the axle or frame of the rake, within reach of the foot or hand of the operator, is a lever, M, whose shorter arm is made segmental in form, and provided with an adjustable cam, N, which bears against the end of the sleeve K.

The operation is as follows: Whenever it is desired to dump the hay gathered by the rake into a windrow the operator presses the outer end of the lever M downward with his foot or hand, (preferably the former), and the cam N forces the sleeve to engage with the pinion I, so that the latter will rotate with the shaft, which, as previously mentioned, is driven by the wheels A. As the machine continues to be drawn forward, the pinion I, engaging with the segmental wheel J, rotates the latter, and raises the rake head and teeth sufficiently to discharge the hay. The rake-head, at about the time the teeth have cleared the windrow, strikes the long arm of the lever M, raising the same and throwing the cam N out of contact with the sleeve, which, in its turn, is disengaged from the pinion I by the spring, permitting the pinion to again rotate upon the shaft F, and the rake to drop back to its former position upon the ground, and continue the operation of raking. If, however, it is found necessary, for any reason, to keep the rake-teeth elevated, the operator presses with his foot upon an arm, O, attached to the side of the pinion I, when such arm has been carried by the pinion, in the operation of raising the teeth, to that side of the shaft next the axle of the rake. By this means the continued pressure upon the arm O prevents the rotation of the pinion, and consequently holds the rake teeth and head in an elevated position. If, however, it is desired to hold the teeth within the hay in order to gather an increased quantity, or in heavy hay, the operator presses upon the arm O, when the same is upon the front side of the shaft F, and thus prevents the pinion I from rotating, and, consequently, the rake head and teeth from lifting.

The cam N is made adjustable upon the lever by any suitable means. In this example of my invention this result is obtained by the set-screws in the former passing through slots formed in the segmental end of the latter. The object of this adjustability is to change the position of the lever with relation to the rake-head, so that it shall be tripped when the teeth have been raised a greater or less distance from the ground. This is of great importance, inasmuch as it is necessary to vary the elevation of the teeth in raking heavy and light hay, or in proportion to the size of the windrows being formed. To clear a large windrow, the teeth must be raised much higher than is necessary to pass over a smaller one.

To permit the backing of the rake without operating the gearing, the pinion G G′ may be arranged in any convenient manner to rotate independently of the shaft F when the machine is backed.

I do not confine myself to the precise construction of the rake-head shown, as my improvements are applicable to any rising and falling head.

Having thus described my invention, what I claim as new, and desire to secure by Letters Patent, is—

1. As a means of applying power from the draft-wheels to the head which supports the rake-teeth, for the purpose of raising the latter, the shaft F, constantly rotating in the forward movement of the machine, and extending across the entire width of the frame, combined with the pinions H H, fixed to the wheel-hubs, and the pinions G G′ on the shaft F, substantially as described.

2. In combination with the segmental gear-wheel and the clutch-sleeve and pinion, a shipping-lever operated from the rake-head, substantially as described, for the purpose specified.

3. The clutch-operating lever M, constructed with an adjustable cam, substantially as described, for the purpose specified.

4. In combination with the rake-head, the shaft F, operated by gearing from the wheels of the rake, the segmental gear-wheel J, the clutch-sleeve and pinion, and shipping-lever, substantially as described, for the purpose specified.

Witnesses: JAMES E. WISNER.
A. B. BRADLEY,
S. P. MORSE.